United States Patent [19]

Hallstrom, Jr.

[11] 4,308,661
[45] Jan. 5, 1982

[54] TOOL FOR SEPARATING END CAP SECTIONS OF TELEPHONE CABLE SPLICE CASES

[76] Inventor: Olof A. Hallstrom, Jr., 1920 Hallstrom Rd., Tillamook, Oreg. 97141

[21] Appl. No.: 138,244

[22] Filed: Apr. 7, 1980

[51] Int. Cl.³ .................... B23P 19/04; H01R 43/00
[52] U.S. Cl. .................................... 29/764; 29/239; 29/256
[58] Field of Search .............. 29/764, 758, 739, 256, 29/258, 266; 254/231, 234, 98, 100

[56] References Cited
U.S. PATENT DOCUMENTS
2,691,212 10/1954 Hildebrand .......................... 29/239

Primary Examiner—Carl E. Hall
Attorney, Agent, or Firm—Oliver D. Olson

[57] ABSTRACT

The end cap separating tool of this invention comprises a pair of spreader blocks, generally U-shaped in plan, the projecting ends of which clamp by means of anchor screws to adjoining end cap halves adjacent their outside edges. A T-handled actuator screw is threaded through a tapped opening in one block and the end of the screw opposite the handle is attached rotatably to the second block, whereby rotation of the screw in one direction moves the one spreader block away from the second, thereby separating one end cap half from the other and from the telephone cable. The other end cap half is separated from the cable by a cord extended across the cap diameter, under the telephone cable and up the opposite side of the cable to the one block where it is secured. Rotation of the screw in the direction to move the one block away from the second block engaging the end cap half results in lifting and rolling the cable away from the end cap half.

7 Claims, 6 Drawing Figures

TOOL FOR SEPARATING END CAP SECTIONS OF TELEPHONE CABLE SPLICE CASES

BACKGROUND OF THE INVENTION

This invention relates to telephone cable splice cases, and more particularly to a novel tool for separating the end cap sections of the case from each other and from the cable.

It is the general practice to remove the splice case, including the end caps, from a spliced telephone cable when work on the splice is required. Since a watertight seal is necessary to protect the wiring, the end cap sections of the cases are secured together and to the cable with a strong adhesive.

The method of separating these end caps heretofore has been to drive chisels or screwdrivers between the end cap halves, for breaking them apart. Considerable effort is required to break the two halves apart, and often results in damage to the end caps, requiring their replacement. Also, one of the separated cap sections usually still adheres to the cable. Using chisels or screwdrivers to separate the end cap from the cable often results in damage to the cable as well as to the cap section.

SUMMARY OF THE INVENTION

In its basic concept, the tool of this invention utilizes two spreader blocks arranged to clamp onto the sides of adjacent end cap sections of a telephone cable splice case, and means is provided for moving the blocks apart, whereby to separate the cap sections. A second function of the tool is provided by a cord which cooperates with the tool to lift and roll the cable out of contact with an end plate section still bonded to the telephone cable.

It is by virtue of the foregoing basic concept that the principal objective of this invention is achieved; namely, to overcome the aforementioned disadvantages and limitations of prior procedures for separating the cap sections of a telephone cable splice case.

Another object of this invention is to provide a tool of the class described which separates telephone cable splice case end cap sections from each other and from the cable with minimum effort and time.

A further object of this invention is to provide a tool of the class described which provides the dual function of separating the end cap sections, and of removing the sections from the cable without damage to the cable or the end caps.

A still further object of this invention is to provide a tool of the class described which is of simplified construction for economical manufacture.

The foregoing and other objects and advantages of this invention will appear from the following detailed description, taken in connection with the accompanying drawings of a preferred embodiment.

DESCRIPTION OF THE PREFERRED EMBODIMENT

Figure 1:
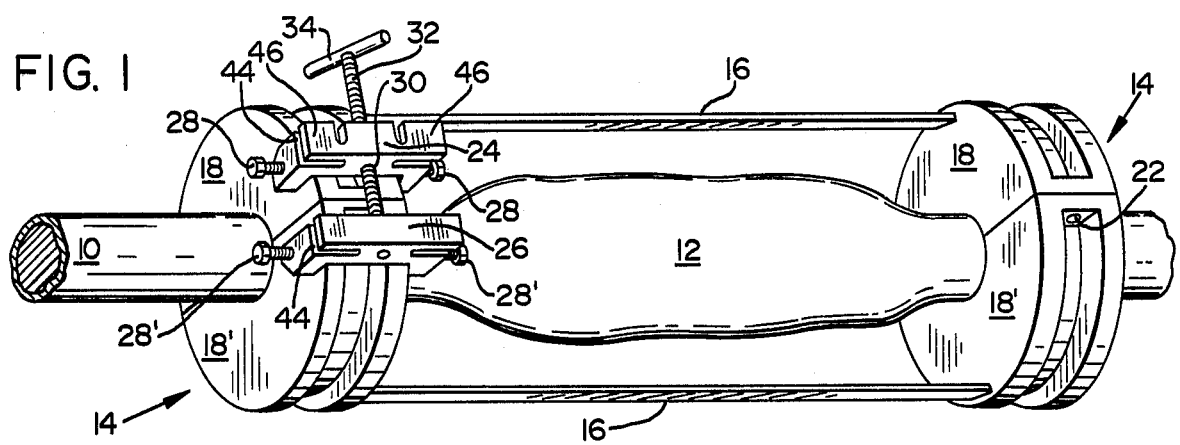
FIG. 1 is a fragmentary perspective view of a telephone cable splice case attached to a cable and having secured to an end cap thereof a separating tool embodying the features of this invention.
Figure 2:
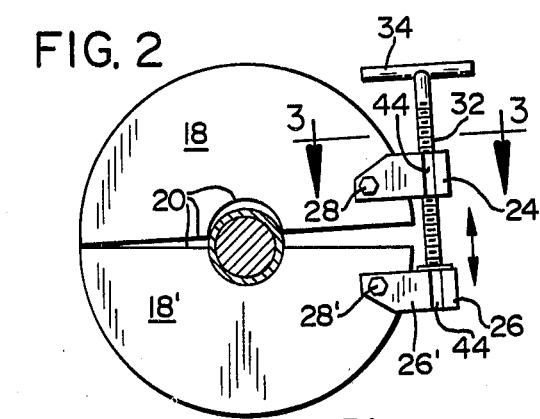
FIG. 2 is an end elevation of the end cap and tool as viewed from the left in FIG. 1, the tool being shown to have been operated to separate the cap halves.

A typical telephone cable splice case assembly is shown in FIG. 1 on a telephone cable 10, without the usual cover shell. The cable splice 12 is confined between the end caps 14 spaced apart by torsion bars 16. The end cap halves 18 and 18' are bonded to each other and to the telephone cable 10 by a water-proof adhesive sealant applied at their confronting edges 20 and by bolts (not shown) extended through bolt holes 22.

Figure 3:
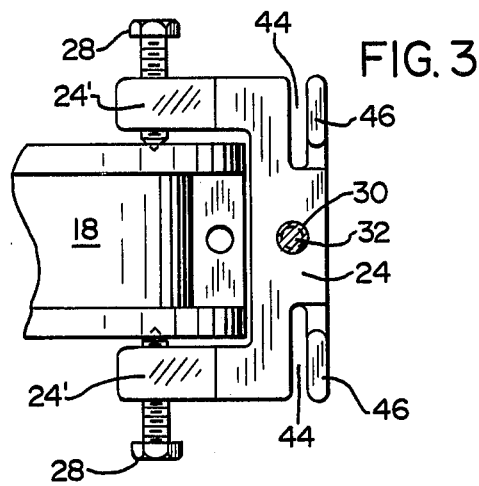
FIG. 3 is a fragmentary horizontal section taken on the line 3—3 in FIG. 2.

As illustrated, the end cap separator tool comprises two spreader blocks 24 and 26. U-shaped in plan, arranged to fit over the edges of the end cap halves 18 and 18' adjacent their bonded edges 20. Means for releasably securing the spreader blocks to the end cap halves is provided by anchor screws 28 and 28' threaded through tapped openings (not shown) in the projecting ends 24' and 26' of the spreader blocks. The anchor screws, being pointed at their ends which contact the sides of the end cap halves, firmly seat into the end cap halves, as shown in FIG. 3.

Some splice case end caps are made up of three sections. These may be separated by the tool of this invention by securing the pair of blocks 24 and 26 to an adjacent pair of cap sections, as will be understood.

Figure 6:
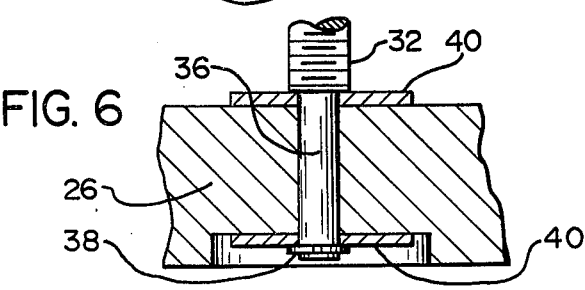
FIG. 6 is a fragmentary vertical section showing the rotatable connection of the lower end portion of the actuator screw to the lower spreader block.

The closed, intermediate portion of the one block 24 incorporates a tapped opening 30 for receiving an elongated actuator screw 32 having a handle 34 at one end. The end of the actuator screw opposite the handle is reduced in diameter to form a shaft 36, (FIG. 6) which is inserted freely through a complimenting opening in the closed, intermediate portion of the other spreader block 26, for rotary movement relative to said block. The screw is secured detachably to the block by means of a snap ring 38 mounted removably in an annular groove in the shaft. Washers 40 on shaft 36 on opposite sides of the block 26 enhance free rotation of the screw relative to the block. In this manner the actuator screw provides means for interconnecting the blocks 24 and 26, and turning the screw in one direction or the other effects movement of the one block 24 toward or away from the other block 26.

Although shown in the preferred embodiment as an actuator screw 32 threaded through the one block 24 and anchored for free rotation within the other block 26 for movement of said one block relative to the other, it will be understood that various other means may be employed for interconnecting the spreader blocks for movement toward and away from each other. This may include a screw having one section threaded in one direction through the one block 24, and a second section threaded in the reverse direction through a tapped opening in the other block 26. Such an arrangement provides simultaneous movement of both blocks toward or away from the other. Another form of interconnecting means may include a hydraulic jack assembly. Another may be a spreader pliers.

Figure 4:
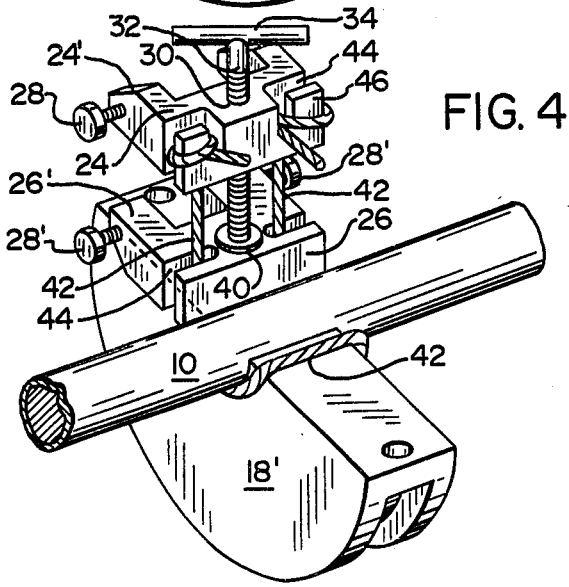
FIG. 4 is a fragmentary perspective view of the tool mounted on an end cap half and showing the operative arrangement of a lifting cord assembly of this invention.
Figure 5:
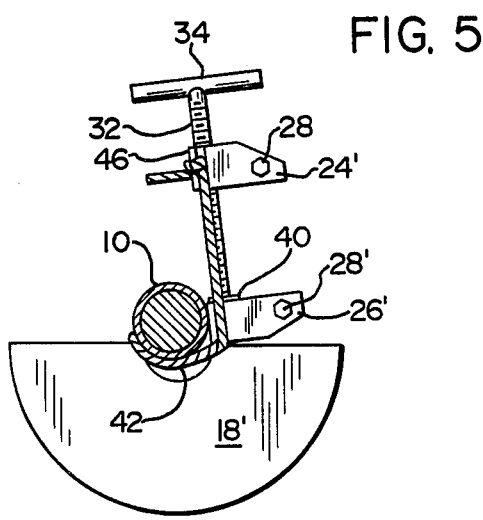
FIG. 5 is an end elevation as viewed from the right in FIG. 4 and showing the functioning of the lifting cord assembly.

After the end cap halves have been separated, one end cap half, for example half 18′, may still remain bonded to the telephone cable 10. Separation of that half 18′ from the telephone cable is provided for by flexible cord means interconnecting the cable with the movable spreader block 24. As illustrated in FIG. 4, a cord 42 extends across the diameter of the end cap half 18′ on the side of the cable opposite the tool, the block 26 of which rests freely on the diammetric edge of the cap half 18′. The cord is looped under and around the cable and extends upward through cord guide slots 44 formed in the closed portions of the blocks 24 and 26. The guide slots assist in guiding the cord to cord anchor ports 46 incorporated on the one block 24, where the ends of the cord 42 are secured.

As will be understood, although shown in the preferred embodiment as a rope, the cord means may be provided by a cable, wire, chain or any other suitable flexible line.

The use of the end cap separating tool described hereinbefore is as follows: When removal of the splice case from the cable is required, the torsion bars 16 are removed and the end cap clamp bolts are removed from the bolt holes 22 on the end caps 14. The end cap separating tool spreader blocks 24 and 26 are secured by means of anchor screws 28 and 28′ to the end cap halves 18 and 18′, respectively, adjacent the bonded edges 20 thereof. Turning the handle 34 of the actuator screw 32 in the appropriate direction threads the one spreader block 24 away from the other block 26. Accordingly, the end cap halves are pulled apart, against the resistance of the bonding adhesive.

The tool then is removed from the cap halves by releasing the anchor screws 28 and 28′. Where an end cap half 18′ remains bonded to the cable, the separating tool is then turned around so that the closed ends of the spreader blocks face the telephone cable 10, and the spreader block 26 is rested on the end cap half adjacent the cable.

The lifting cord 42 is extended across the diameter of the end cap half 18′ on the side of the cable opposite the tool block 26, and looped under the cable, as shown in FIG. 4. The cord then is extended upward through guide slots 44 to the anchor posts 46 where the cord ends are tied off. Turning the actuator screw 32 in the appropriate direction moves the spreader block 24 away from the other block 26 resting on the end cap half 18′, thereby tightening the cord under the telephone cable. The upward pull of the cord lifts and rolls the telephone cable outward, separating it from the end cap half against the resistance of the bonding adhesive.

By separating the end cap halves from each other and from the telephone cable in this manner, damage to the end caps and the cable is avoided.

It will be apparent to those skilled in the art that various changes may be made in the size, shape, type, number and arrangement of parts described hereinbefore without departing from the spirit of this invention.

Having thus described my invention and the manner in which it may be used, I claim:

1. A tool for separating the bonded end cap sections of telephone cable splice cases, comprising:
   (a) a pair of spreader blocks, one associated with each of a pair of adjacent end cap sections,
   (b) means on each spreader block for releasably securing the latter to an end cap section, and
   (c) means interconnecting the spreader blocks for moving the spreader blocks toward and away from each other.

2. The separating tool of claim 1 wherein the means interconnecting the spreader blocks comprises an actuator screw engaging the blocks and arranged upon rotation to move the blocks one relative to the other.

3. The separating tool of claim 1 wherein the means interconnecting the spreader blocks comprises an actuator screw threaded through an opening in one block and anchored to the other block for rotation relative thereo.

4. The separating tool of claim 1 wherein the spreader blocks are U-shaped in plan, and the means for releasably securing the spreader blocks to end cap sections comprise anchor screws threaded through tapped openings in the projecting end portions of each spreader block.

5. The separating tool of claim 1 including flexible cord means arranged to extend across one end cap section and under a telephone cable secured thereto, and arranged for connection to one of the spreader blocks that is movable relative to the other block.

6. The separating tool of claim 5 wherein the cord means is a flexible line, the ends of which are adapted to be secured to anchor posts on the spreader block that is movable relative to the other block.

7. The separating tool of claim 1 wherein:
   (a) the means interconnecting the spreader blocks comprises an actuator screw threaded through an opening in one block and anchored to the other block for rotation relative thereto,
   (b) the spreader blocks are U-shaped in plan,
   (c) the means for releasably securing the spreader blocks to end cap sections comprise anchor screws threaded through tapped openings in the projecting end portions of each spreader block, and
   (d) flexible cord means is arranged to extend across one end cap section and under a telephone cable secured thereto, and is arranged for connection to the said one block.

* * * * *